July 7, 1931.　　　　G. C. LEACH　　　　1,813,300
SEED GRADER
Filed Oct. 22, 1929　　6 Sheets-Sheet 3
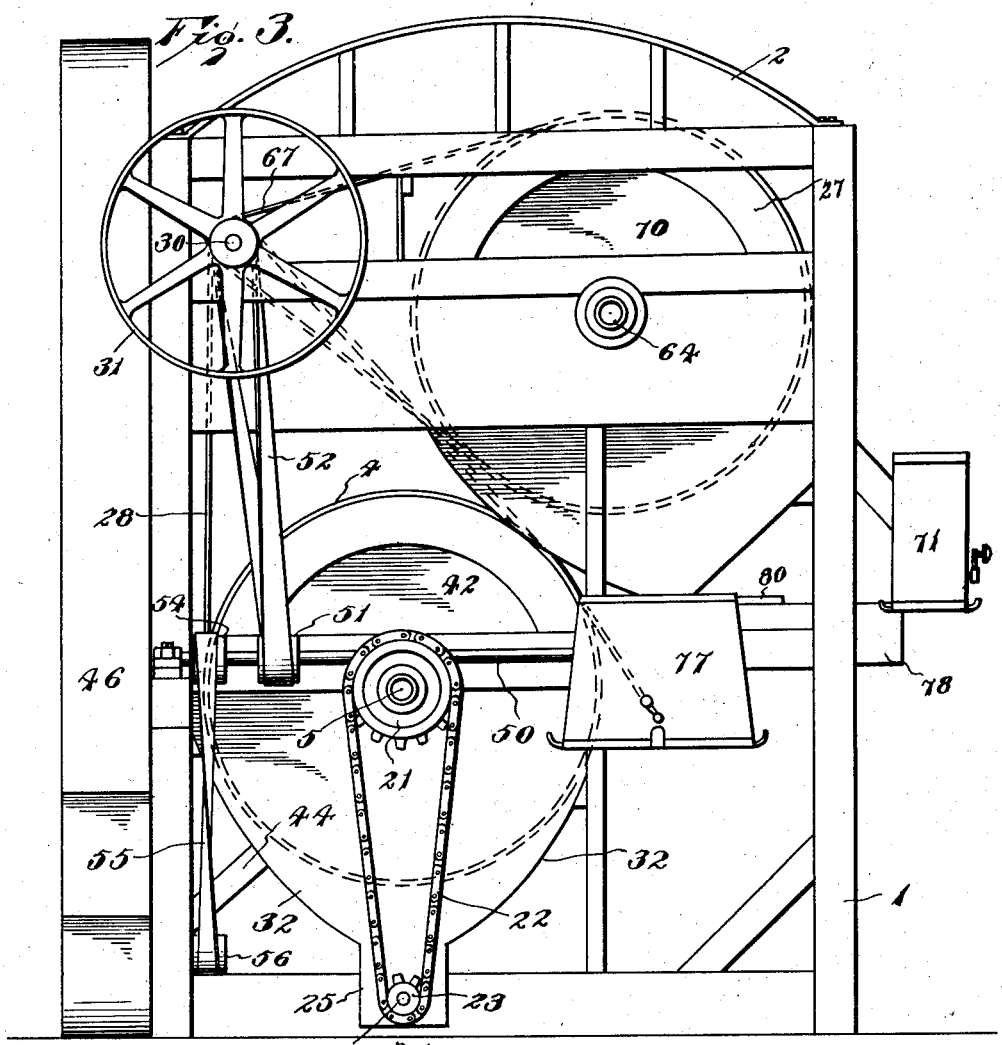
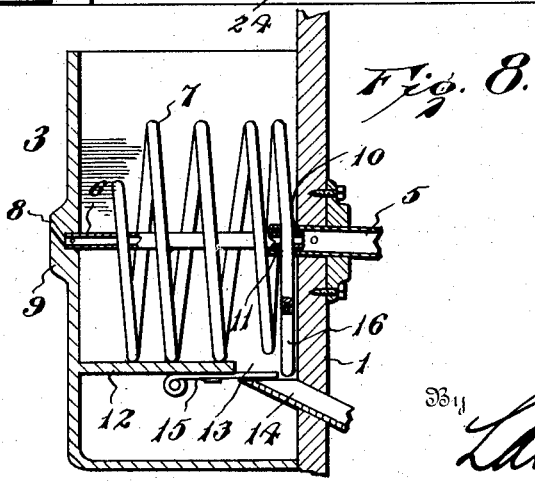
Inventor
G. C. Leach
By Lacey & Lacey, Attorneys

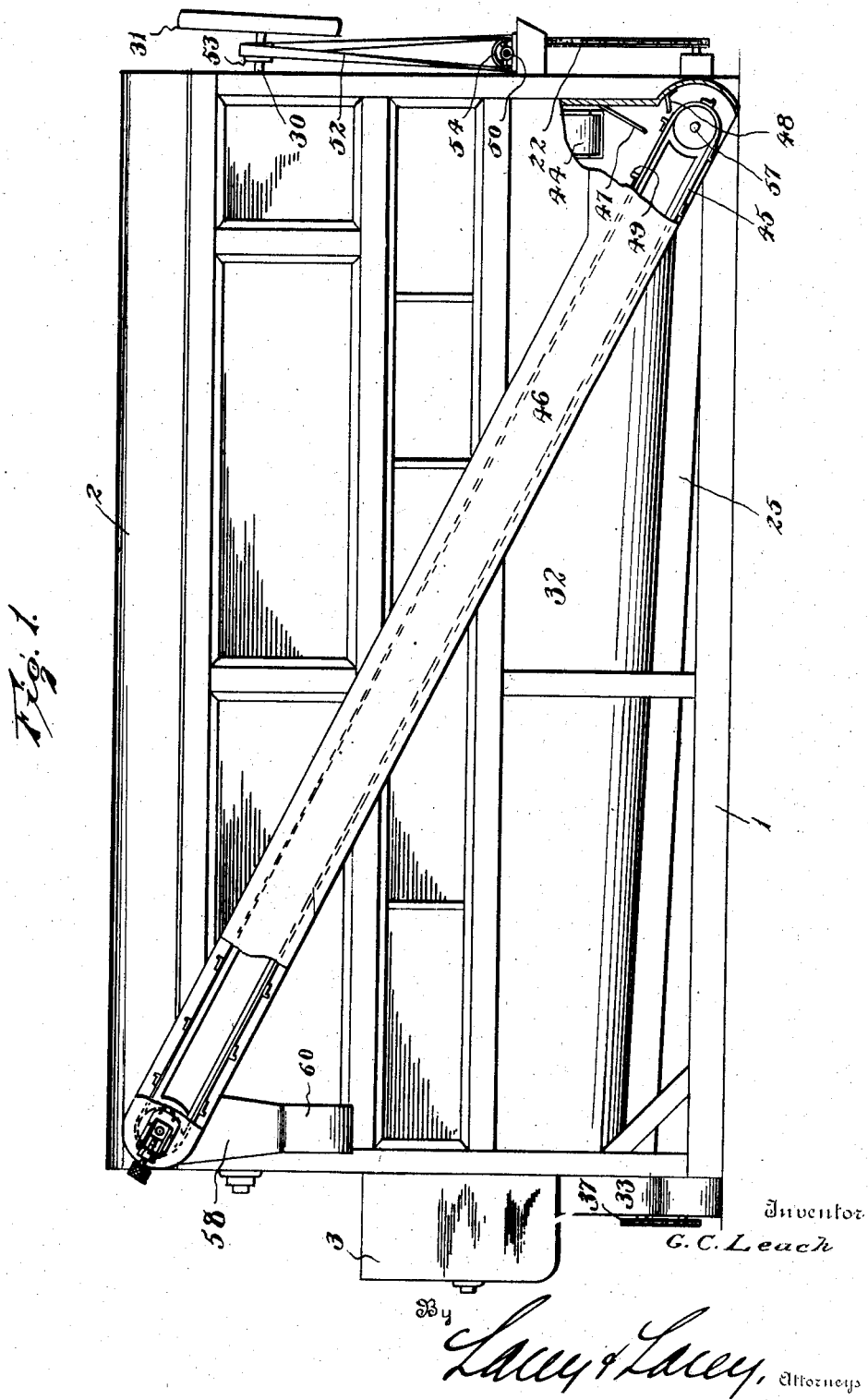

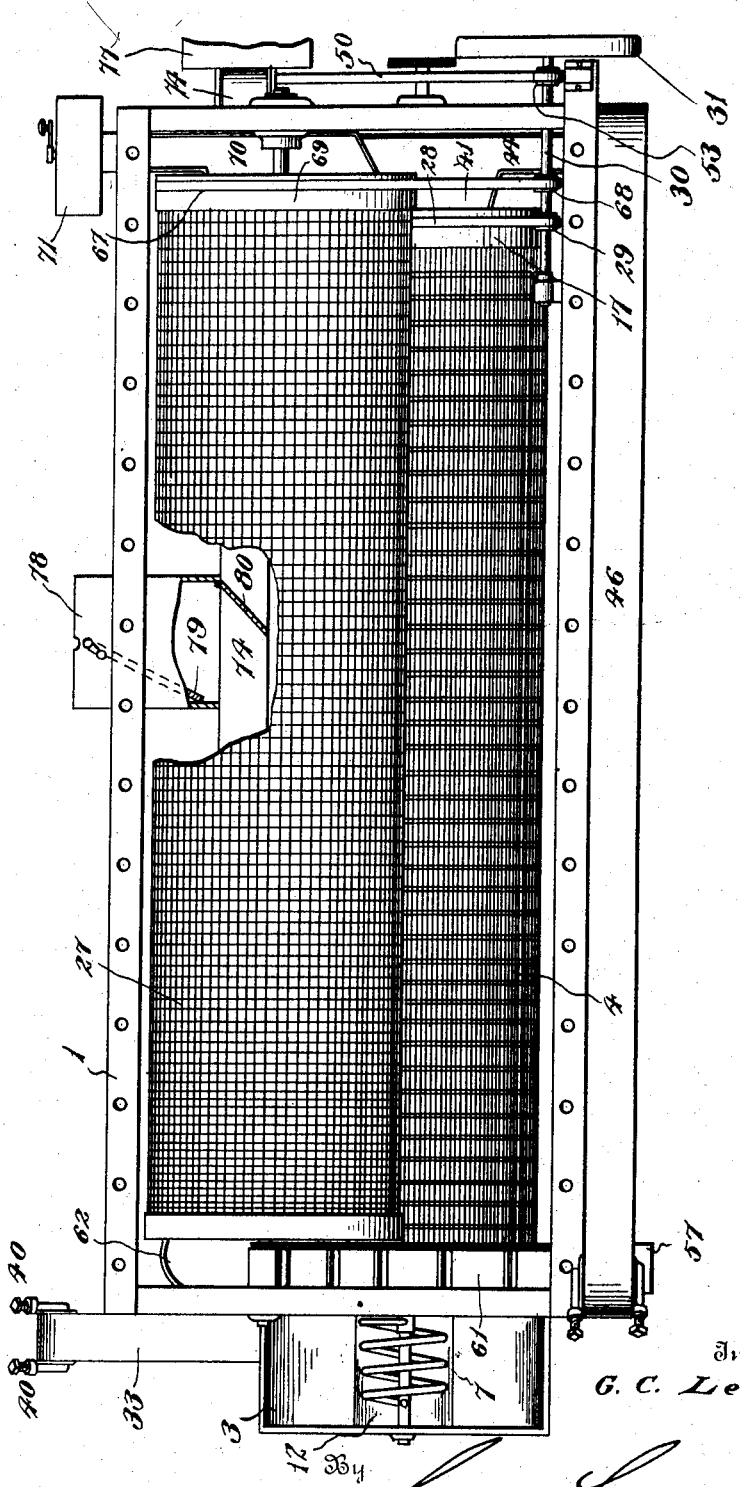

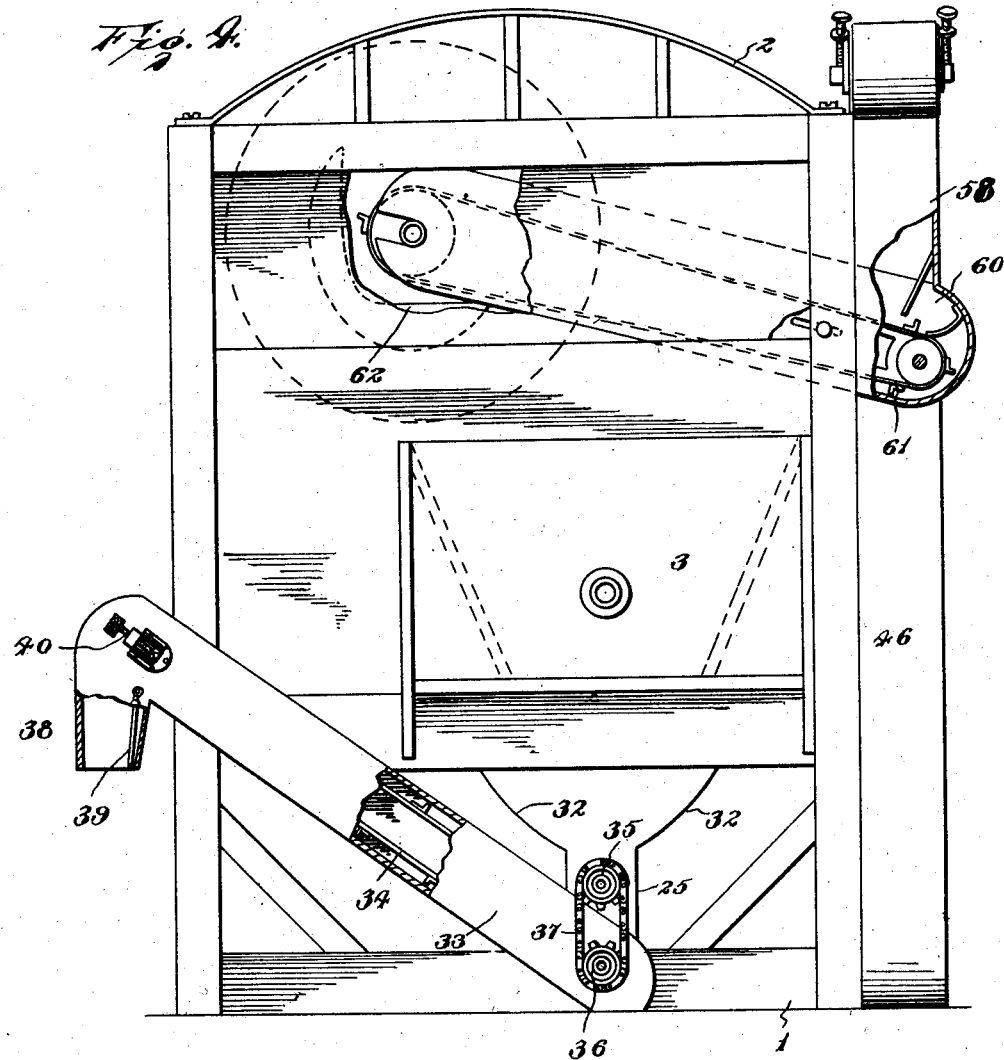

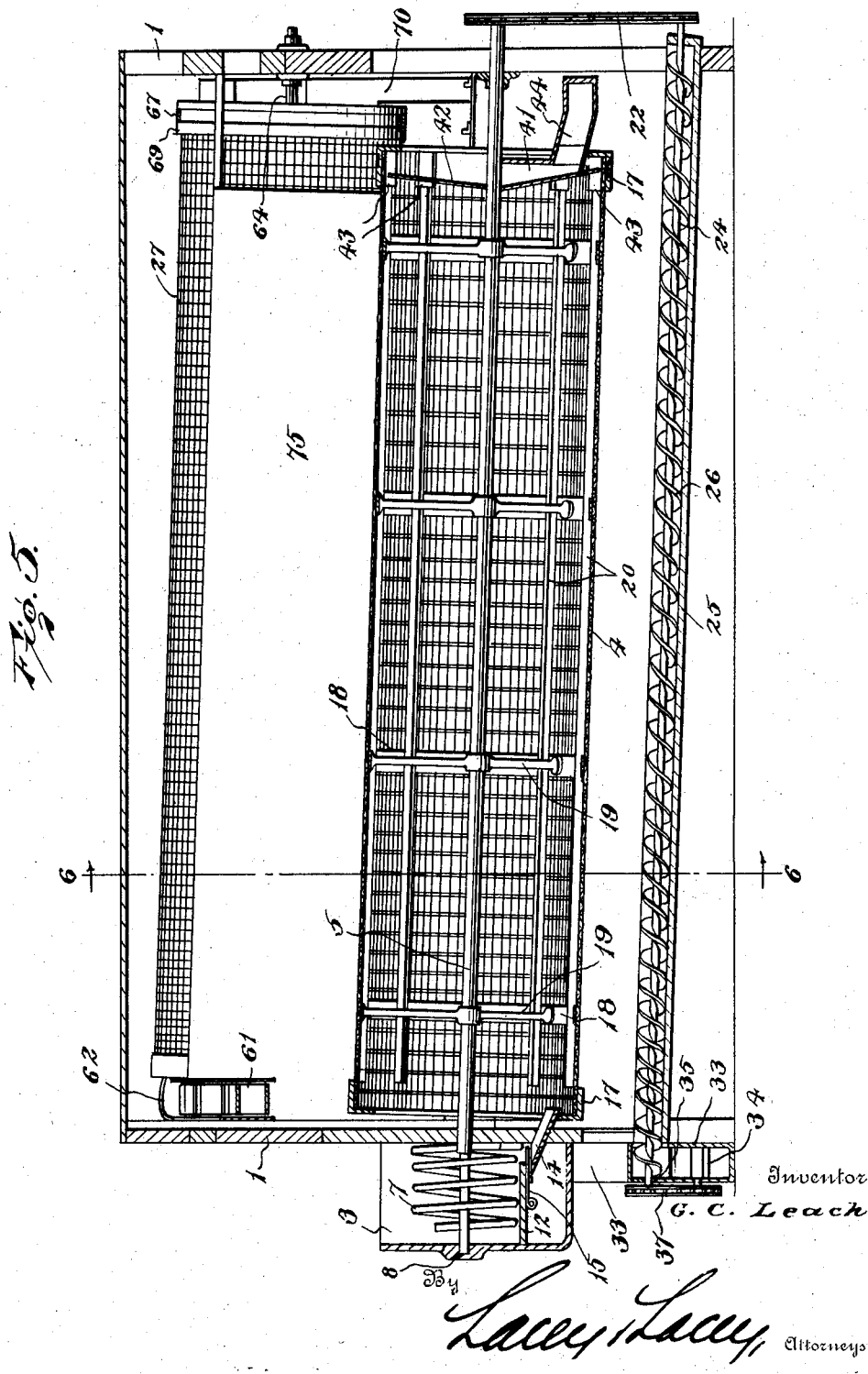

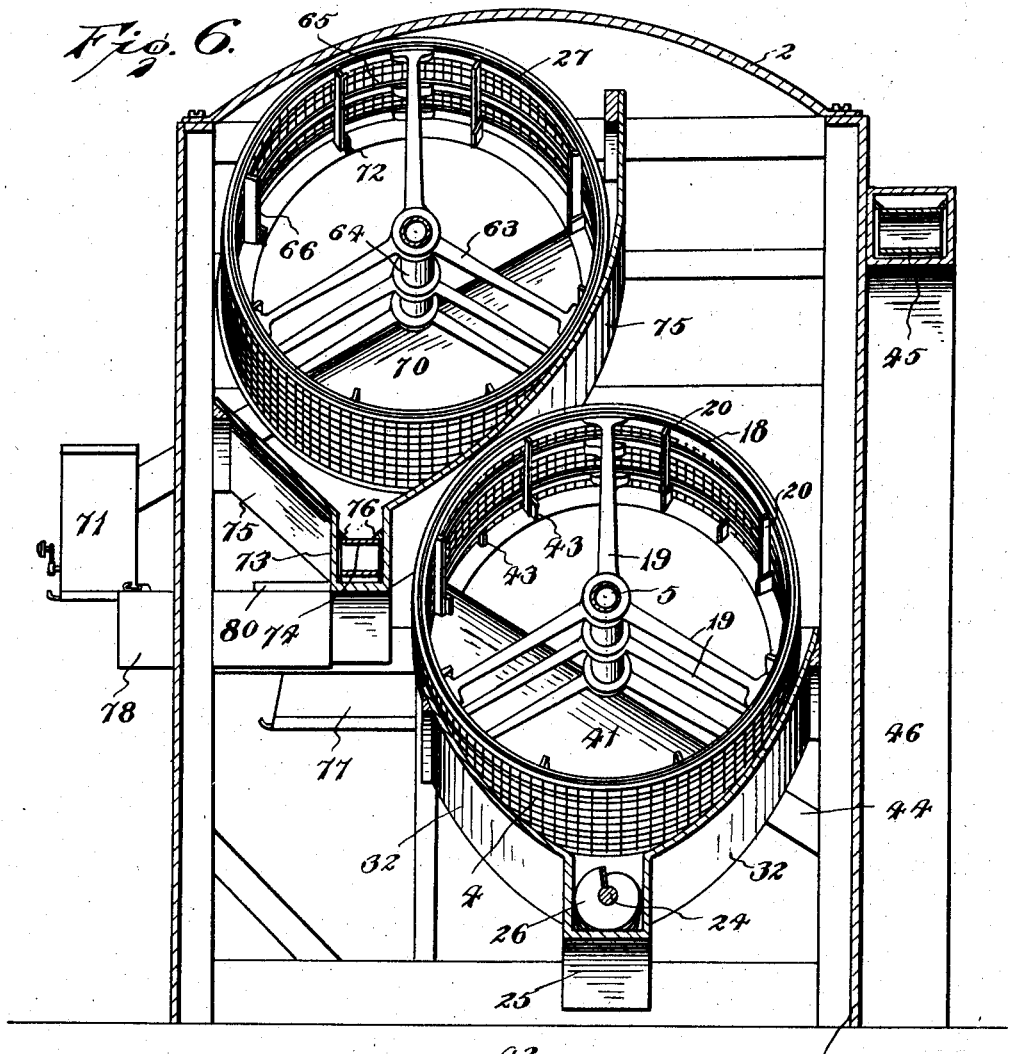
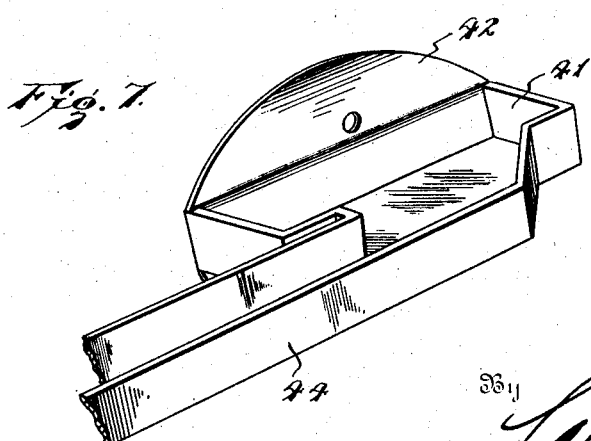

Patented July 7, 1931

1,813,300

UNITED STATES PATENT OFFICE

GROVER C. LEACH, OF BROWNWOOD, TEXAS, ASSIGNOR TO THOMAS RICHARD LEACH, OF BROWNWOOD, TEXAS

SEED GRADER

Application filed October 22, 1929. Serial No. 401,522.

The present invention has for its object the provision of a seed cleaner and grader which may be used in connection with a cotton gin and which will receive the seeds from the gin and automatically clean them and separate them according to their grades by the force of gravity. One embodiment of the invention is illustrated in the accompanying drawings and will be hereinafter fully described, the novel features being particularly pointed out in the appended claims.

In the drawings:

Figure 1 is a side elevation, partly broken away, of a seed cleaner embodying the invention, Fig. 2 is a top plan view partly broken away, Fig. 3 is a front end elevation, Fig. 4 is a rear end elevation, Fig. 5 is a longitudinal vertical section, Fig. 6 is a transverse section on the line 6—6 of Fig. 5, Fig. 7 is a detail perspective of a chute which is employed, and Fig. 8 is an enlarged detail longitudinal section of the chute which receives the seed from the cotton gin and from which it is fed into the seed grader.

In carrying out the invention, there is provided a frame 1 which may be of any suitable material and constructed so as to accommodate and firmly support all of the working parts, the top of the frame being covered by a hood 2 which is somewhat arched, as shown most clearly in Fig. 3, whereby to protect the working parts from possible injury by objects accidentally falling upon the same.

At one end of the frame is a hopper or receiving chute 3 which is so located that the seed deposited in the hopper may be fed directly into the cleaning drum 4 of the machine, said drum 4, as shown in Fig. 5, being located in the lower portion of the frame and inclined slightly downwardly from front to rear. The drum 4 is carried by a shaft 5 which is journaled in bearings provided therefor at the ends of the frame and said shaft is hollow, as shown most clearly in Fig. 8, its front end projecting through the front end of the supporting frame and receiving the rear end of a hollow shaft 6 which carries a feeding spiral or worm 7 within the hopper 3. The front end of the shaft 6 communicates directly with an opening 8 formed through a bearing block 9 so that oil may be fed into the shaft 6 and will pass through the same to be delivered into the front end of the shaft 5 and thereby lubricate the latter, suitable openings being formed through both shafts to permit the oil to reach the bearings. The worm or spiral 7 is a stout wire coiled into helical form and having its front end inserted in and secured to the shaft 6 and its rear end inserted through openings 10 provided therefor in the end of the shaft 5 and openings 11 formed in the rear end of the shaft 6 so that the end of the spiral or coil locks the two shafts together and, consequently, whenever either shaft is rotated, the other must also rotate. The side walls of the hopper 3 converge downwardly so as to direct the seed onto the bottom plate 12 which extends from the front wall of the hopper toward the rear wall thereof, which rear wall is provided by the end of the main frame 1. The bottom 12, however, terminates short of the frame 1, as shown at 13 in Fig. 8, and a short chute 14 extends through the end of the main frame from a point immediately under the space 13 to deliver the seed within the cleaning drum 4, as will be understood upon reference to Fig. 5. Slidably mounted upon the bottom 12 adjacent the opening 13 is a cut-off plate 15 which is adapted to extend more or less over the upper end of the chute 14 and thereby regulate the flow of the seed into the drum. The rear end of the coil 7 is provided with a detachable extension or terminal 16 which will pass through the space at the end of the cut-off plate once during each revolution of the coil and will thereby prevent the seed collecting and stagnating over the chute 14. The coil is of such diameter that it works close to the bottom plate 12, as clearly shown, and as it rotates it will engage the seed and feed the same over the bottom plate 12 to the chute. The coil will have some resiliency so that it will yield somewhat to bunched seed but at the same time it will effectually agitate the seed so that clogging of the action cannot occur.

The drum 4 is a cylinder formed of wire netting having its end portions reinforced by circular bands of metal, indicated at 17, and secured upon hoops or rings 18 disposed at intervals in the length of the drum and carried by spokes 19 which are secured to and radiate from the shaft 5. Longitudinal rails 20 are provided on the inner circumference of the drum and extend from the rear end thereof to points near the front end of the same so that as the drum is rotated the seed feed thereinto will be taken up by the successive rails or bars and thereby turned over and over so that they will be agitated and the trash and dirt separated from the seed. The front ends of the rails 20 are spaced from the front band 17, as shown clearly in Fig. 5, so that there will be a clear space at the receiving end of the drum into which the seeds may be deposited without being forced from the drum by contact with any of the rails. The rear end of the shaft 5 projects beyond the rear end of the drum and the rear end of the main frame and is equipped with a sprocket 21 about which is trained a sprocket chain 22 which is also trained about a sprocket pinion 23 on the rear end of a conveyer shaft 24 which is located immediately below the drum. The conveyer shaft 24 extends through a longitudinal trough 25 extending from end to end of the main frame, and within said trough said shaft carries a worm or screw conveyer 26 whereby the trash and dirt dropping through the drum will be carried forwardly to be discharged as waste material in a manner which will be presently set forth.

The drum 4 is driven by a belt 28 which passes around the drum in frictional contact with the band 17 at the rear end thereof and is also trained about a pulley 29 on a shaft 30 which is disposed longitudinally of the main frame at the rear end thereof and projects beyond the rear end of the frame, the extremity of the shaft being equipped with a band pulley 31 which may receive motion from any convenient prime mover. When the driving shaft 30, therefore, is rotated, the drum 4 will be rotated through the agency of the belt 28 and the drum, in turn, will transmit the motion through the sprocket 21, chain 22 and sprocket pinion 23 to the lower screw conveyer. Upon referring to Fig. 6 more particularly, it will be noted that aprons 32 are provided within the frame at each side of the trough 25 and extend upwardly therefrom in divergent relation at opposite sides of the drum 4 so that the material passing through the drum will be directed positively into the trough. At its front end the screw conveyer 26 enters a housing 33 on the front end of the frame and, immediately below the screw conveyer, said housing contains the lower bight of a belt conveyer 34 which extends upwardly and laterally upon the front end of the main frame to carry away the dirt and trash brought to it. The conveyer shaft 24 extends through the housing 33 and is equipped with a sprocket 35 while the drum or roller supporting the lower bight of the conveyer 34 also has its axle extending through the front side of the housing and equipped with a sprocket pinion 36 about which and the pinion 35 is trained a sprocket chain 37. At the upper end of the housing 33, a hopper or chute 38 is provided to which a bag may be attached to receive the matter brought to the hopper by the conveyer and within this hopper or chute is a cut-off plate or gate valve 39 which may be set to prevent flow through the hopper while a filled bag is being removed and an empty bag substituted therefor. It will thus be seen that, when the cleaning drum 4 is rotated, the motion will be transmitted to the screw conveyer and thence to the belt conveyer so that these parts will operate in unison and be driven from a single source of power. As shown in Figs. 2 and 4, the bearings for the upper supporting roller or drum of the conveyer 34 are slidably mounted and are adjusted by means of set bolts 40 so that wear upon the elevator may be taken up and the elevator belt maintained under the proper tension. This same arrangement is employed on all conveyer aprons which may be employed in the machine.

At the rear end of the drum 4 is provided a combined hopper and chute comprising a hopper member 41 so formed as to extend within the end of the drum and project up to a point near the top thereof so that the seed within the drum cannot flow directly out through the open end of the drum but must be delivered into said chute, the front wall of the chute extending upwardly, as shown at 42, to bar the egress of the seed, as will be understood upon reference to Fig. 5. Upon the inner circumference of the drum at the rear end of the same are paddles 43 which, as the drum rotates, will pass through and engage the seed to lift the same to the chute 41 and discharge the seed thereinto. From the rear side of the hopper, an outlet trough or chute 44 extends laterally downward to discharge the seed onto an elevator apron 45 which is disposed within a housing 46 on the side of the main frame and extends upwardly from the lower corner of the frame to the upper front corner thereof, as shown clearly in Fig. 1. A deflector 47 is secured on the main frame immediately adjacent the discharge end of the chute 44 so that the seed will be diverted forwardly and prevented from passing over the rear lower end or bight of the elevator and, consequently, being lost. To further guard against such loss, an apron 48 is secured on the frame immediately adjacent the bight of the elevator so that any seed which may pass the end of the deflector 47 will be caught by said apron. This apron is preferably a strip of leather or other flexible durable material and so disposed that it will impinge against the lifter bars 49 of the elevator and be thereby vibrated slightly so that any seed caught upon the apron will be shaken off onto the elevator belt, as will be understood upon reference to Fig. 1. Mounted upon the rear end of the frame at an intermediate point in the height of the same is a transverse shaft 50 upon which is a pulley 51 operatively connected by a belt 52 with a pulley 53 on the shaft 30 immediately adjacent the driving pulley 31. A pulley 54 is also secured upon the shaft 50 adjacent the end of the same and this pulley 54 is connected by a belt 55 with a pulley 56 on the inner end of the shaft 57 carrying the lower drum or roller supporting the elevator belt. In this manner the elevator is driven from the main driving shaft. A chute or hopper 58 is mounted on the main frame immediately adjacent the upper end of the elevator casing 46 and the elevator delivers the seeds taken up by it into said hopper. The lower end of said hopper 58 is in direct communication with a casing 60 in which is housed a belt conveyer 61 extending across the front end of the frame within the same and arranged to deliver the seed deposited thereon into a chute 62 which is arranged adjacent the upper front end of the grading drum 27 to deliver the seed into the latter.

The upper drum 27 is arranged to one side of the lower drum 4 so as to economize space within the main frame and is similar in construction, although the wire netting is of a coarser mesh. Like the cleaning drum 4, the grading drum is inclined downwardly and rearwardly slightly so as to facilitate the passage of the seed therethrough and it is carried by spokes 63 from a central shaft 64, the spokes being secured at their outer ends to rings or hoops 65 and longitudinal rails or beater bars 66 extending upon the inner circumference of the drum. The drum 27 is driven from the shaft 30 by a belt 67 trained about a pulley 68 on the driving shaft and passing around the rear band 69 on the drum and frictionally engaging said band. A combined hopper and chute 70 is disposed at the rear end of the grading drum 27 and is of the same construction as the hopper and chute 41, this hopper and chute 70 delivering the cull seed into a bagging hopper 71 mounted on the side of the main frame at the rear end thereof. The drum 27 is also provided with paddles 72 at its rear end corresponding to the paddles 43 in the lower drum whereby the seed will be taken up and delivered into the hopper 70 in an obvious manner.

Below the upper grading drum 27, a trough 73 extends longitudinally of the frame and in this trough is mounted a belt conveyer 74 which is adapted to catch the seed falling through the drum and convey the same rearwardly. Aprons 75 are secured in the frame at opposite sides and below the drum 27 so that the seed passing through the drum will be positively directed into the trough and onto the belt conveyer. Within the trough beveled strips 76 extend from end to end thereof immediately over the side edges of the conveyer belt so as to prevent seed passing over said edges and being lost. The belt conveyer 74 delivers the second grade seed thereon into a bagging hopper 77 at the rear end of the main frame, and said hopper as well as the bagging hopper 71 is equipped with a pivoted gate valve whereby the seed may be directed to either side of the hopper so that a filled bag may be removed from one side of the hopper while another bag is being filled at the opposite side thereof.

Approximately midway the length of the main frame, a bagging hopper 78 is mounted on the side of the same and this hopper also is equipped with a deflector or pivoted gate 79 whereby the seed may be directed to either side of the hopper accordingly as an empty bag is located at one or the other side thereof. At the rear wall of the hopper 78, there is pivoted a deflector 80 which is adapted to extend over the belt 74 so that the highest grade seeds will be caught by the deflector and diverted into the hopper 78.

The operation will be readily understood from the foregoing description, taken in connection with the accompanying drawings. The seed coming from the gin is delivered into the hopper 3 and thence fed into the lower cleaning drum, as has been stated. The drum is constantly revolving and the longitudinal rails on the inner circumference thereof will, therefore, be constantly lifting the seed and dropping it onto the bottom of the drum so that the sand and other dirt commingled with the seed will be quickly separated therefrom as well as the small particles of leaves and other trash which may adhere thereto. This foreign matter will, of course, be caught by the screw conveyer and carried off to the chute 38 where it may be delivered into a bag or deposited on the ground. The seed will be delivered to the elevator 45 and then carried up to the hopper 57 through which it will be transferred to the conveyer 61. Said conveyer delivers the seed into the upper cleaning drum which is of coarser mesh than the lower drum but is constantly rotating and, consequently, the longitudinal rails on the inner circumference of the drum will be constantly lifting the seed and dropping it onto the bottom of the drum. The seed will pass through the meshes of the drum by gravity and the fully matured seed, being heavier, will pass through the drum before the second grade seed and this heavier first grade seed will be caught upon the belt 74 and turned aside therefrom by the deflector 80 while the lighter seed will be caught by the belt at the rear of the deflector and conveyed to the bagging hopper 77. Any seed which may remain in the drum at the rear end thereof will be caught by the paddles 72 and delivered into the hopper 70 and then delivered into the bagging hopper 71. The seed, however, which is so small and light that it fails to pass through the meshes of the drum will be culls of inferior commercial value. It must be remembered that fully matured seed is heavier than the immature seed, although the latter may be larger. I, therefore, utilize gravity as the grading force, the mature seed falling to the bottom of the drum and passing therethrough before the lighter less mature seed so that the first grade seed will be deposited on the belt 74 in advance of the deflector while the second grade seed will be deposited at the rear of the deflector. The machine operates automatically and cleans and grades the seed by gravity, the action being continuous and rapid although the machine is driven at a low speed so that the separation of the seed into grades is efficiently accomplished.

Having thus described the invention, I claim:

1. A seed-cleaning and grading machine comprising upper and lower drums inclined downwardly toward their rear ends, means for rotating said drums, a hopper at the front end of the lower drum to receive seed and deliver it into the lower drum, a conveyer below the lower drum receiving trash therefrom and carrying it to a point of discharge, means for transferring cleaned seed from the lower drum to the upper drum, a conveyer below the upper drum receiving graded seed therefrom and means whereby said seed will be discharged from said conveyer according to grade.

2. In a seed cleaner and grader, the combination of a supporting frame, a drum rotatably mounted in the frame and having a shaft provided with a hollow front end projecting through the front end of the frame, a hopper on the front end of the frame around the end of said shaft, a feeder shaft within the hopper, and a coil disposed about said shaft and having one end fixed to the shaft and its opposite end extended diametrically through the end of the drum shaft and the end of the feeder shaft whereby to lock them together.

3. In a seed cleaner and grader, a main frame, an inclined screen drum rotatably mounted therein, means secured on the inner circumference of the drum for agitating the seed whereby the seed will pass through the drum according to weight, a conveyer belt below the drum receiving the seed therefrom, a deflector disposed transversely over the belt at an intermediate point in the length of the same, a hopper at one side of the belt into which seed will be diverted from the belt by the deflector, a hopper at the rear end of the belt receiving seed therefrom, a hopper disposed at one side of the frame at the rear end thereof, and a chute mounted within the rear end of the drum and extending through the rear end thereof to transfer seed from the interior of the drum to the last-mentioned hopper.

In testimony whereof I affix my signature.

GROVER C. LEACH. [L. S.]